United States Patent

Barrus

[19]

[11] Patent Number: 5,850,346
[45] Date of Patent: Dec. 15, 1998

[54] SYSTEM FOR EMBEDDING HIDDEN SOURCE INFORMATION IN THREE-DIMENSIONAL COMPUTER MODEL DATA

[75] Inventor: John Barrus, Lexington, Mass.

[73] Assignee: Mitsubishi Electric Information Technology Center America, Inc., Cambridge, Mass.

[21] Appl. No.: 579,547

[22] Filed: Dec. 27, 1995

[51] Int. Cl.$^6$ .............................. G06F 7/38; G03G 21/00
[52] U.S. Cl. ........................ 364/748.01; 235/375; 380/3; 380/51; 399/366
[58] Field of Search ...................... 364/748.01; 235/319, 235/380, 375; 395/503, 509, 513; 399/365–367; 380/3, 23, 42, 51

[56] References Cited

U.S. PATENT DOCUMENTS

| | | | |
|---|---|---|---|
| 5,440,682 | 8/1995 | Deering | 395/503 |
| 5,517,611 | 5/1996 | Deering | 395/503 |
| 5,594,225 | 1/1997 | Botvin | 235/379 |

*Primary Examiner*—Emmanuel L. Moise
*Attorney, Agent, or Firm*—Robert K. Tendler

[57] ABSTRACT

In the subject invention, source information indicating an author, designer or other source of a three-dimensional computer model is embedded in the low-order digits or bits of floating point values representing vertices in the model. The changes in these low-order bits are undetectable visually because the lower-order bits provide more accuracy than is needed to display an image. In one embodiment, the first floating point value representing the model has its least significant digits in its mantissa set to a code representing the first character of the source information. The second floating point value in the model has its least significant digits in the mantissa set to a code representing the second character of the source information. With the third and following floating point values, a similar pattern is followed. Additional other methods may be used and a variety of pattern making and encoding techniques would allow someone to determine the source of a model and whether it was modified. It may also be possible to transform and shift vertices and their ordering in a data file so that the order and location of the vertices in the data file indicates the source of the model.

12 Claims, 5 Drawing Sheets

SYSTEM FOR EMBEDDING HIDDEN SOURCE INFORMATION IN THREE-DIMENSIONAL COMPUTER MODEL DATA

FIELD OF THE INVENTION

This invention relates to three-dimensional computer models and devices and mechanisms for embedding and detecting source information, such as author or designer, in data representing a three-dimensional computer model.

BACKGROUND OF THE INVENTION

Throughout history, authors and creators of images or text have found ways to indicate the source of their work, including signing the work, or perhaps including some symbol that is unique to that artist. In this way, direct copies of a work can be traced to its original author. In this electronic age, it is much easier to create copies of information like text documents or three-dimensional models because such information is represented as a series of bits in a computer. It may be in the interest of a designer of a three-dimensional model to track re-use or transmission of the model. In fact, the ease of copying is a disincentive to provide access to the model.

A number of techniques have been used to track source information or to control access to an electronic document. One such technique involves embedding information in the document which is used to authenticate the document. An example of this technique is the Dataglyph software available from Xerox Corporation of El Segundo, Calif. Dataglyphs appear to the human eye as a gray rectangle on the paper, but when scanned in and decoded, contain information useful to the computer, which could include authentication or author information.

SUMMARY OF THE INVENTION

In the subject invention, source information is embedded in the low-order or least significant digits or bits of floating point values representing vertices in a three-dimensional computer model. The changes in these low-order bits of the three-dimensional model, unlike text, are undetectable visually because the low-order bits provide more accuracy than is possible to display an image. Nonetheless, the embedded information is available to the computer and anyone who knows how to extract it. Thus, the invention provides a convenient way to place some sort of digital signature in the bits representing the three-dimensional model that would allow the model to be tracked and answer the question "Is this a model that I created or was it created independently and just looks the same?". At the same time this information does not affect the visual characteristics of the model.

Accordingly, one aspect of the invention is a computer-readable medium having computer-readable signals recorded thereon defining floating point numbers representing information of a three-dimensional computer model, wherein the least significant bits of the mantissa of the floating point numbers of vertices of the computer model are source information defined using a function of the source information and vertex ordering information. Vertex ordering information may be the order in which the vertex information appears in a data file, or an order determined by sorting the vertex information.

Another aspect of the invention is a computer system for encoding source information in computer-readable signals defining floating point numbers representing information of a three-dimensional computer model, comprising a means for storing computer readable signals defining floating point numbers representing information of a three-dimensional computer model, wherein the information includes vertex information; means for reading floating point numbers from the means for storing; means for replacing least significant bits of the floating point numbers with source information according to a function of the source information and vertex ordering information; and means for storing the floating point numbers including the source information.

Another aspect of the invention is a computer system for detecting source information in computer-readable signals defining floating point numbers representing information of a three-dimensional computer model, comprising means for storing computer readable signals defining floating point numbers representing vertices of a three-dimensional computer model, wherein the least significant bits of the floating point of numbers include source information; means for reading floating point numbers from the means for storing; and means for comparing source information in the least significant bits of the floating point numbers to expected source information.

In one embodiment, the first floating point value representing the model has its least significant digits in its mantissa set to be a code representing the first character of the source information. The second floating point value in the model has its least significant digits in the mantissa set to a code representing the second character of the source information. With the third and following floating point values, a similar pattern is followed. Additional other methods may be used and a variety of encoding and pattern making techniques would allow someone to determine the source of a model and whether it was modified. It is also possible to transform and shift vertices and their ordering so that the order and location of the vertices indicates the source of the model.

Using such techniques, a person may be able to destroy information, perhaps destroying the model as well, but not change the information to appear that it came from somewhere else. This is useful since many models may be used in a read-only format, where the information is never modified but only read into a computer. Additional digital signatures and encryption may be useful to further prevent the information from being modified.

BRIEF DESCRIPTION OF THE DRAWINGS

These and other features of the subject invention will be better understood in connection with the Detailed Description taken in conjunction with the Drawing of which.

DETAILED DESCRIPTION

Three-dimensional computer models are represented in a digital computer using data indicative of vertices and lines or polygons that connect those vertices. Generally, floating point numbers are used to represent values for the vertices in each of three-dimensions in three-dimensional space, for example, in x, y, and z coordinates in Cartesian space. Some models also contain information about textures (bit-maps that are drawn on the polygons) and about normals (to specify the surface normal at a given vertex).

Many computers provide the means, either in software or hardware, to deal with numbers in floating point or "scientific" notation (as contrasted to fixed point). In this format, the computer word (or, often, a group of several words) is divided into bit groups or fields as shown below:

| Sign | EXPONENT | FRACTION (or mantissa) |

This format represents the value defined by equation (1):

$$(\text{sign}) \; (2^{EXPONENT}) \cdot (\text{FRACTION}) \qquad (1)$$

Floating point values often have 8 digits of precision in the mantissa and 2 or 3 digits of precision on the exponent. There is a standard floating point format from IEEE that details how the floating point number is stored. In some machines, the "2" in the equation (1) is replaced by "16," which amounts to a scaling of the exponent. Both the exponent and fraction are signed: the exponent field carries its own sign, and the explicit sign bit (the leftmost bit of the entire floating-point representation) belongs to the fraction. Various strategies may be followed regarding what, if any, bits of the floating-point number should be complemented if the sign of the fraction is negative. For 32-bit floating point representation, the exponent is typically 8 bits, and the fraction, or mantissa, is typically 23 bits.

Floating point representation provides very large dynamic range in number size, and permits a constant level of significance to be maintained over this range. These advantages are counterbalanced by the greater complexity of performing most arithmetic operations on floating-point numbers. Furthermore, floating-point arithmetic is particularly susceptible to loss of significance errors in specific circumstances.

The eight or more mantissa digits represent a number with much more accuracy than is needed to display an image. Changing some of the lower order digits (or bits) using a known pattern would allow storage of information that would be undetectable visually, either by looking at the display of the model or by looking at the data. Using encryption or other hiding techniques would also make it difficult to detect or change the information.

Figure 1:
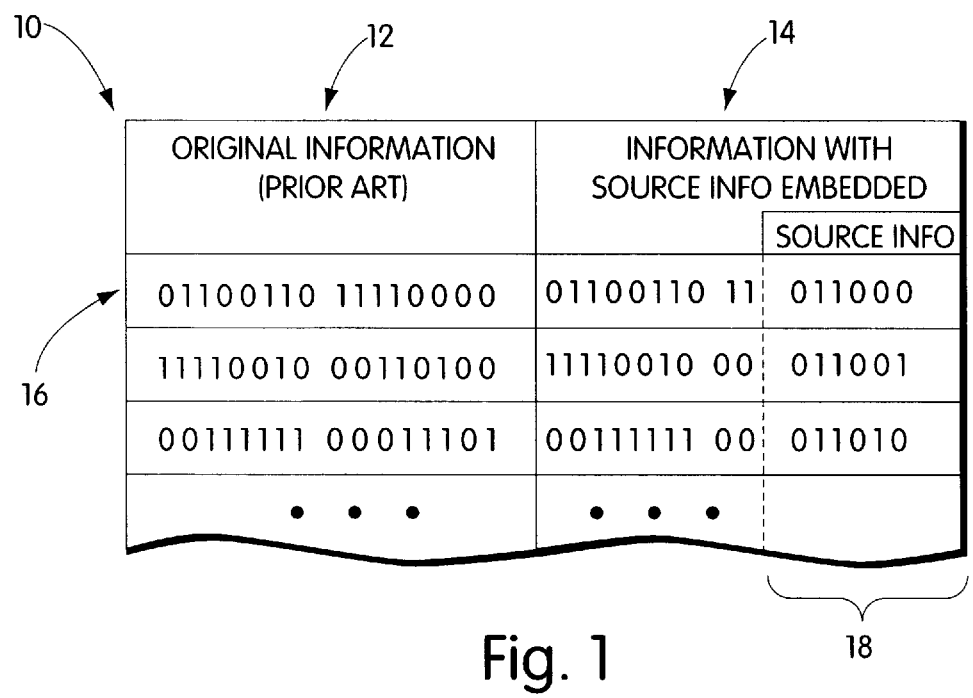
FIG. 1 is a table comparing original information of a three-dimensional computer model with such information in accordance with the present invention.
Figure 2:
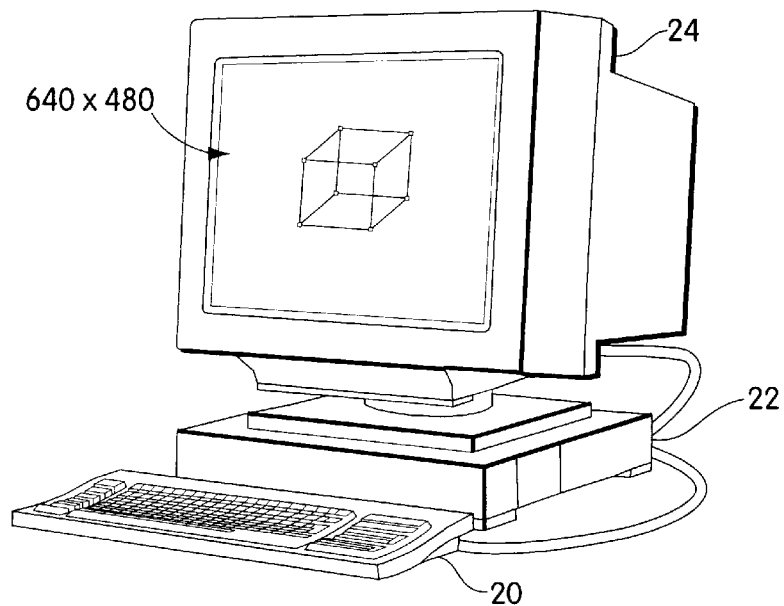
FIG. 2 is a perspective view of a computer system displaying a three-dimensional model.
Figure 3:
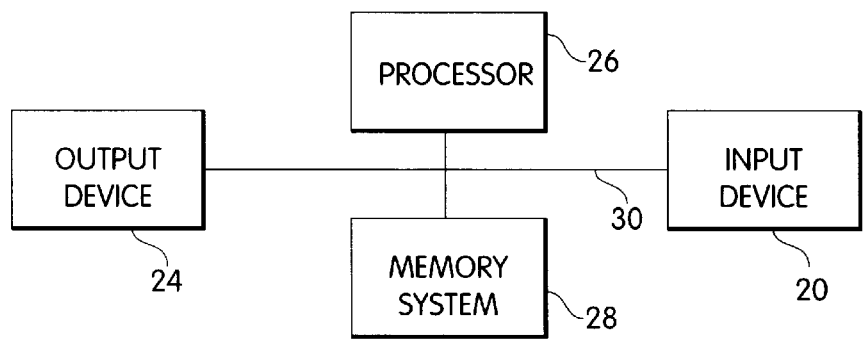
FIG. 3 is a block diagram of a computer system using floating-point representations of data for three-dimensional computer models.
Figure 4:
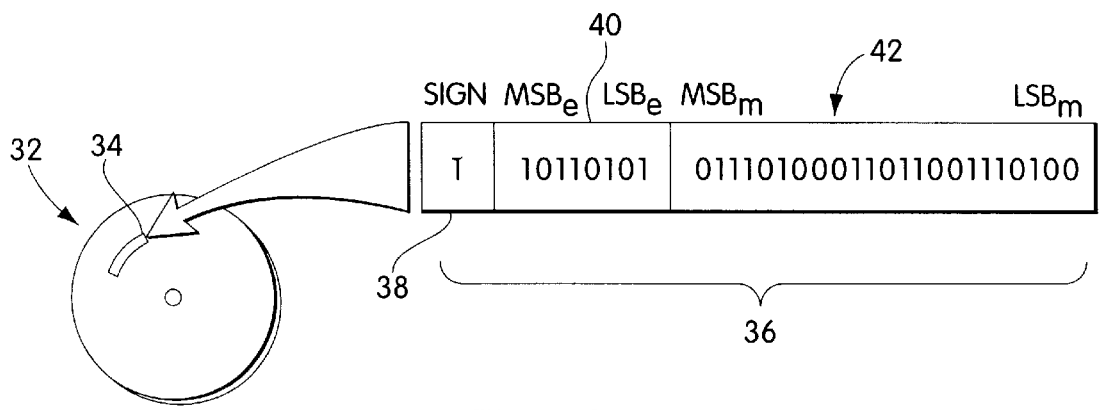
FIG. 4 is a schematic diagram of a computer-readable and writable medium containing recorded information of a three-dimensional computer model.

FIG. 1 is a Table 10 illustrating and comparing information of a typical three-dimensional model with information with source information embedded therein in accordance with the invention. Column 12 of Table 10 indicates a typical three-dimensional model information with the original fractional number. Column 14 represents the same information as modified in accordance with the invention in each row. Row 16, for example, compares the number "01100110 11110000" with its corresponding source-embedded representation in column 14. In this example, the lower two least significant bits 18 are used to store the embedded source information, e.g., "01100110 11011000," stores a value "011000", corresponding to the decimal number 24 which corresponds to the letter "X". FIG. 2 is a perspective view of a computer displaying a three-dimensional model. It includes an input device 20, a main system 22, and a display 24. A typical display resolution is 640×480 picture elements (pixels), but many other resolutions are commercially available. The resolutions commonly used in displays are generally not as fine as the resolution proved by 32-bit floating point numbers. Thus these numbers are generally truncated anyway in the process of displaying a three-dimensional model. Hence, by adjusting the least significant bits of the mantissa in the floating point numbers representing the three-dimensional model, such changes are generally not visually detectable. FIG. 3 is a block diagram of the computer system shown in FIG. 2. It generally includes an input device 20, an output device 24 such as the display, as well as a processor 26 and memory system 28, all of which are interconnected by a bus or other interconnection mechanism 30. The processor performs the steps necessary to display the three-dimensional model on the display 24 in accordance with program instruction read from the memory system 28. The memory system 28 also stores the floating point representations and makes them available to the processor 26. The processor 26, in connection with this invention, performs those steps and operations on the floating point representations to both encode the source information in the three-dimensional model data as well as to detect the presence of the embedded source information.

The memory system 28 is generally comprised of a slower non-volatile memory and faster volatile random-access memory elements as is known in the art. Data is typically read from a non-volatile storage medium such as a disk into these random access elements for easier and faster access by the processor 26.

A suitable non-volatile storage medium is shown in FIG. 34 at reference numeral 32, as an example. This medium 32 includes tracks 34 in which information is recorded, either magnetically or optically, or both. This information is read out to generate a signal which can be interpreted as a stream of binary digits (bits). This signal is manipulated by the processor 26. A 32-bit floating point representation, such as shown at 36, includes a sign-bit 38, an exponent 40 and a mantissa 42.

Figure 5:
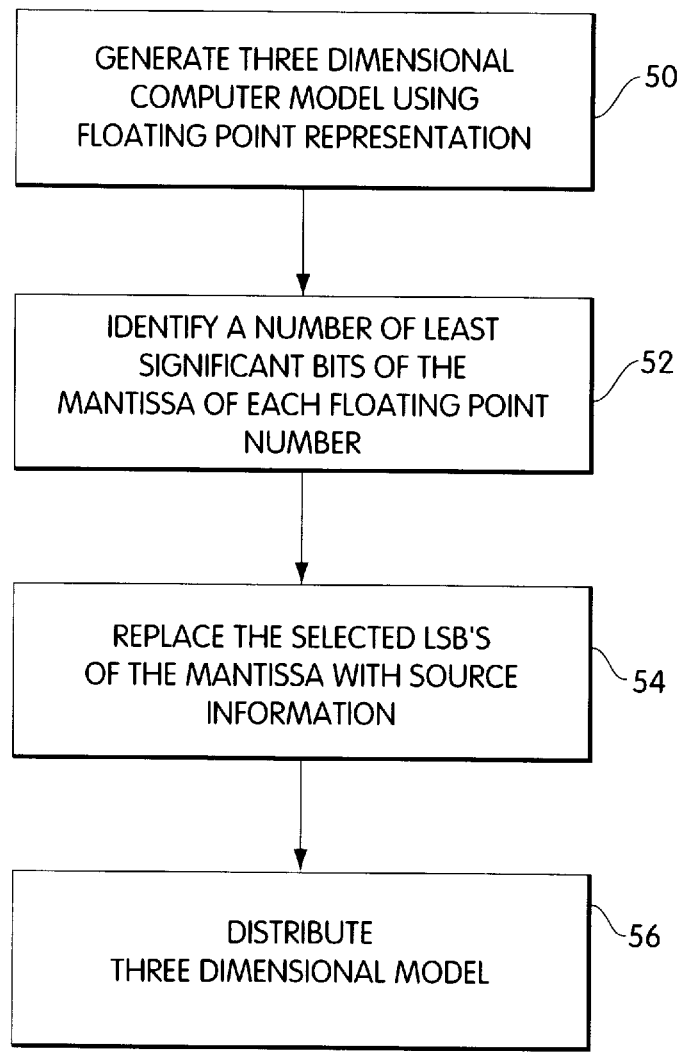
FIG. 5 is a flowchart describing how source information is embedded in data representing a three-dimensional computer model.

Referring now to FIG. 5, the process of embedding source information will now be described. First, a three-dimensional computer model is generated in step 50 using floating point representation. A number of the least significant bits of the mantissa in each floating point number to be used for source information is then identified in step 52. A selected number of least significant bits of the mantissa are then replaced with values representing source information in each of the floating point numbers. After this information is replaced, the three-dimensional computer model can then be distributed (step 56).

The example illustrated in FIG. 1 for embedding information may be generated by processing a data file containing the three-dimensional and model data starting with the first floating point value (normal or vertex). The first value may be from the first vertex in the data file, or the vertices may be sorted into a particular order first to provide a different vertex ordering. All three values of a vertex may be used to embed source information, or only one or two values of each vertex. In this example, the source information is "XYZ". Thus, in the first floating point value, the least significant digits of the mantissa (LSDm) are set to a code representing the first value of the source information, e.g., "011000", or 24 in base 10. The second value has its LSDm set to the code representing the second character of the source information. With the third digit, set to a code representing the third character of the source information.

See Table 1. It is possible to apply a function to the source information, such as an accumulation function modulo the number of LSBs used for the source information. Additionally, the number of bits used for the source information may be spread among the values used to represent a particular vertex.

TABLE 1

| Original Data (last 16 bits) | Changed Data (last 16 bits) | Value represented |
|---|---|---|
| . . . 01100110 11110000 | . . . 01100110 11011000 | X (011000) - $24_{10}$ |
| . . . 11110010 00110100 | . . . 11110010 00011001 | Y (011001) - $25_{10}$ |
| . . . 00111111 00011101 | . . . 00111111 00011010 | Z (011010) - $26_{10}$ |

Using the above outlined technique, an individual might be able to destroy the information. (perhaps destroying the model as well) but not change it to appear that it came from somewhere else. In fact, many models are used "read-only" where the information is never modified but only read in to a computer.

Figure 6:
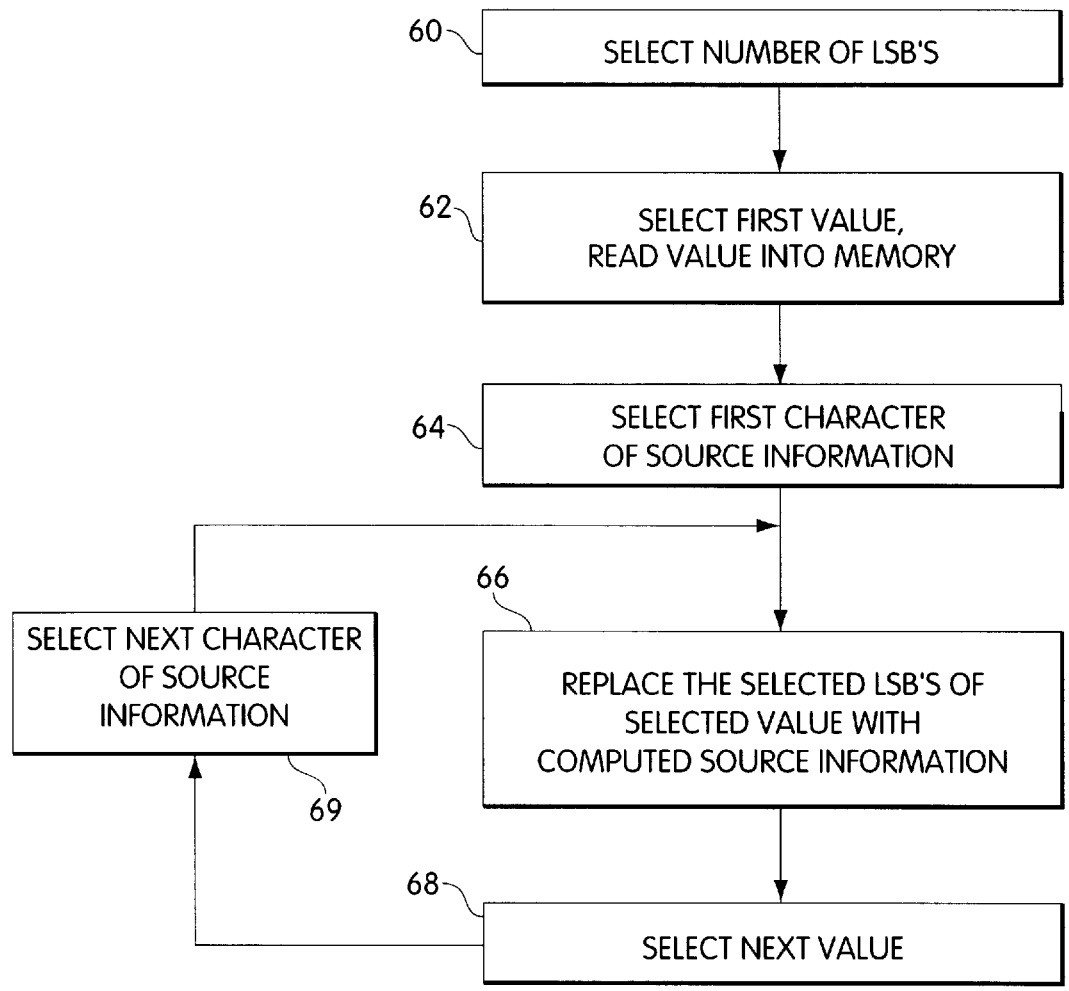
FIG. 6 is a more detailed flow diagram of a particular embodiment of the invention.
Figure 7:
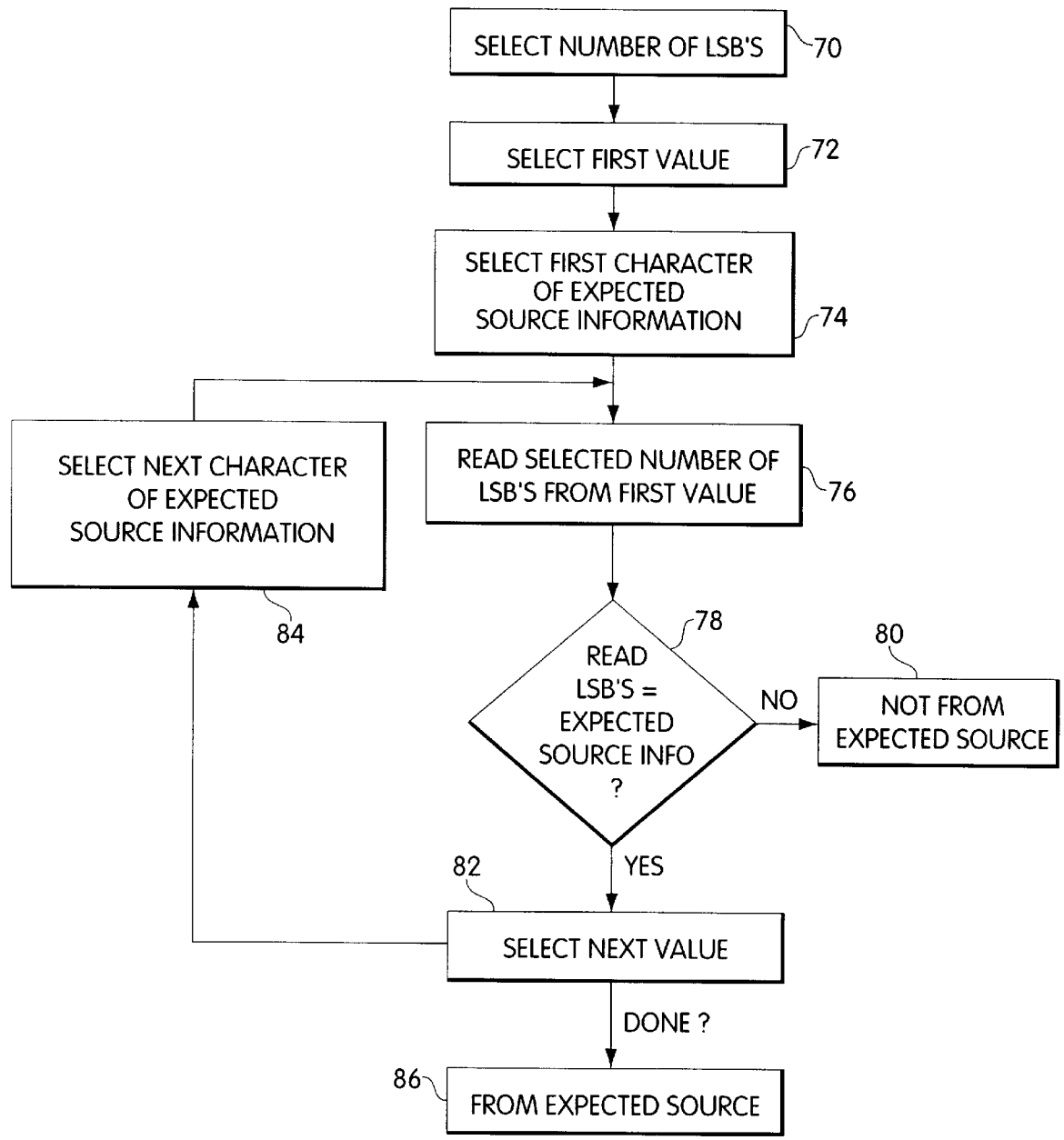
FIG. 7 is a flowchart describing how source information in data representing a three-dimensional computer model is detected in a particular embodiment of the invention.

This method is illustrated in more detail by the flowcharts of FIGS. 6 and 7. FIG. 6 describes how the source information is embedded into the original data. First, a number of least significant bits of the original data is selected in step 60. Six or less of the lower order bits is typically all that is needed for alphanumeric source information. The first floating point value from the list of vertices is then selected in step 62. The list may be taken directly from a data file or may be the result of sorting the data file. The first character of the source information is then selected in step 64. The selected LSBs of the selected floating point value are then replaced with the selected source information in step 66. The next floating point value is then selected in step 68 and in step 69, the next character of the source information is selected. Processing returns to steps 66 and 68 until all the characters of the source information have been processed. In this manner, a pattern of the least significant bits is defined by the order of the vertices processed and the source information. If this pattern is detected, it indicates a high probability that the original data has been obtained from the indicated source.

To detect such information, a corresponding detection process is shown in FIG. 7. A number of the least significant bits is selected in step 70, as is done in step 60 of FIG. 6. This number should be the same number used to encode a model with the source information. The first floating point value from the list of vertices is then selected in step 72 and the first character of the expected source information is then selected in step 74. In step 76 the selected number of least significant bits are then read from the first value. If the read least significant bits are equal to the expected source information, processing continues. Otherwise processing terminates and an indication is sent that the data is not from the expected source. If the data matches in step 78, the next value is selected in step 82 and the next character of the expected source information is updated in step 84. Processing then continues with steps 76, 78 and 82 until all characters of the source information have been extracted. When all characters have been extracted and if all the least significant bits match the expected source information for all floating point values, an indication is made that the model data comes from the expected source.

Additional techniques for hiding information in models include transforming and shifting vertices (or ordering the vertices) so that the order or location of the vertices indicates the source of the model. Generally, such a function will have as its operands a value indicating source and possibly a vertex number. This function is evaluated according to the modulo of the number of least significant bits used to embed the source information.

Well guarded encoding and patterning techniques would allow a determination of the source of a model by its actual source and a verification that the model was not modified. This will be useful in the near future when more and more three-dimensional models will change hand over a world-wide computer network.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A computer system for encoding source information in computer-readable signals defining floating point numbers representing information of a three-dimensional computer model, comprising:

means for storing computer readable signals defining floating point numbers representing information of a three-dimensional computer model, wherein the information includes vertex information;

means for reading floating point numbers from the means for storing;

means for replacing least significant bits of the floating point numbers with source information according to a function of the source information and vertex ordering information; and means for storing the floating point numbers including the source information.

2. The computer system of claim 1, wherein the vertex ordering information is an order of appearance of the vertex information on the computer-readable medium.

3. The computer system of claim 1, further comprising means for sorting the vertex information on the computer-readable medium to obtain the vertex ordering information.

4. A computer system for detecting source information in computer-readable signals defining floating point numbers representing information of a three-dimensional computer model, comprising:

means for storing computer readable signals defining floating point numbers representing vertices of a three-dimensional computer model, wherein the least significant bits of the floating point numbers include source information;

means for reading floating point numbers from the means for storing; and means for comparing source information in the least significant bits of the floating point numbers to expected source information.

5. The computer system of claim 4, wherein the vertex ordering information is an order of appearance of the vertex information on the computer-readable medium.

6. The computer system of claim 4, further comprising means for sorting the vertex information on the computer-readable medium to obtain the vertex ordering information.

7. A computer-implemented process for encoding source information in computer-readable signals defining floating point numbers representing information of a three-dimensional computer model, comprising:

storing computer readable signals defining floating point numbers representing information of a three-dimensional computer model on a computer readable medium, wherein the information includes vertex information;

reading floating point numbers from the computer readable medium;

replacing least significant bits of the floating point numbers with source information according to a function of the source information and vertex ordering information; and storing the floating point numbers including the source information.

8. The computer-implemented process of claim 7, wherein the vertex ordering information is an order of appearance of the vertex information on the computer-readable medium.

9. The computer-implemented process of claim 7, further comprising:

sorting the vertex information on the computer-readable medium to obtain the vertex ordering information.

10. A computer-implemented process for detecting source information in computer-readable signals defining floating point numbers representing information of a three-dimensional computer model, comprising:

storing computer readable signals defining floating point numbers representing vertices of a three-dimensional computer model on a computer readable medium, wherein the least significant bits of the floating point of numbers include source information;

reading floating point numbers from the computer readable medium; and comparing source information in the least significant bits of the floating point numbers to expected source information.

11. The computer-implemented process of claim 10, wherein the vertex ordering information is an order of appearance of the vertex information on the computer-readable medium.

12. The computer-implemented process of claim 10, further comprising:

sorting the vertex information on the computer-readable medium to obtain the vertex ordering information.

* * * * *